United States Patent [19]

Rodal

[11] Patent Number: 4,767,970
[45] Date of Patent: Aug. 30, 1988

[54] DYNAMIC BRAKE CONTROL FOR A TAPE DRIVE SYSTEM

[75] Inventor: David R. Rodal, Palo Alto, Calif.

[73] Assignee: Ampex Corporation, Redwood City, Calif.

[21] Appl. No.: 945,734

[22] Filed: Dec. 22, 1986

[51] Int. Cl.[4] .............................................. H02P 3/12
[52] U.S. Cl. .................................... 318/375; 318/60; 318/261; 318/364; 318/379
[58] Field of Search ................. 318/60, 258, 261, 269, 318/273, 364, 368, 373, 374, 375, 376, 56, 57, 63, 87, 362, 400, 442, 563, 379; 307/64; 361/23, 30

[56] References Cited

U.S. PATENT DOCUMENTS

| | | | |
|---|---|---|---|
| 3,755,712 | 8/1973 | De Viney et al. | 318/375 X |
| 4,195,255 | 3/1980 | Guttmann | 318/375 X |
| 4,374,352 | 2/1983 | Webster | 318/375 X |
| 4,481,449 | 11/1984 | Rodal | 318/375 |

FOREIGN PATENT DOCUMENTS

| | | | |
|---|---|---|---|
| 2002117 | 8/1970 | Fed. Rep. of Germany | 318/364 |
| 2315118 | 10/1974 | Fed. Rep. of Germany | 318/375 |
| 2938928 | 4/1981 | Fed. Rep. of Germany | 318/563 |
| 55-26080 | 2/1980 | Japan | 318/375 |
| 57-101581 | 6/1982 | Japan | 318/364 |
| 58-107085 | 6/1983 | Japan | 318/373 |
| 0462260 | 6/1975 | U.S.S.R. | 318/375 |

OTHER PUBLICATIONS

ATR-100 Series Recorder/Reproducer vol. 1, Operation and Maintenance, Ampex Corp. pp. 4-16 and 4-17, Jul. 1980.
ATR-116/124 Multichannel Recorder/Reproducer Service Manual, Ampex Corp. pp. 4-26 and 4-27, Jul. 1983.

*Primary Examiner*—Bentsu Ro
*Attorney, Agent, or Firm*—Nat Kallman; George B. Almeida; Richard P. Lange

[57] ABSTRACT

In a tape drive system, a dynamic brake control circuit provides dynamic braking for slowing and stopping an associated tape reel and motor system in the event of a power failure. Upon sensing a power failure, the electrical energy stored in a capacitor supplies electrical energy to enable the control circuit, which in turn supplies a controlled conductive path for the flow of a dynamic braking current due to the back electromotive force signal generated by the motor, to effect the controlled dynamic braking of the drive motor to a stop.

18 Claims, 1 Drawing Sheet

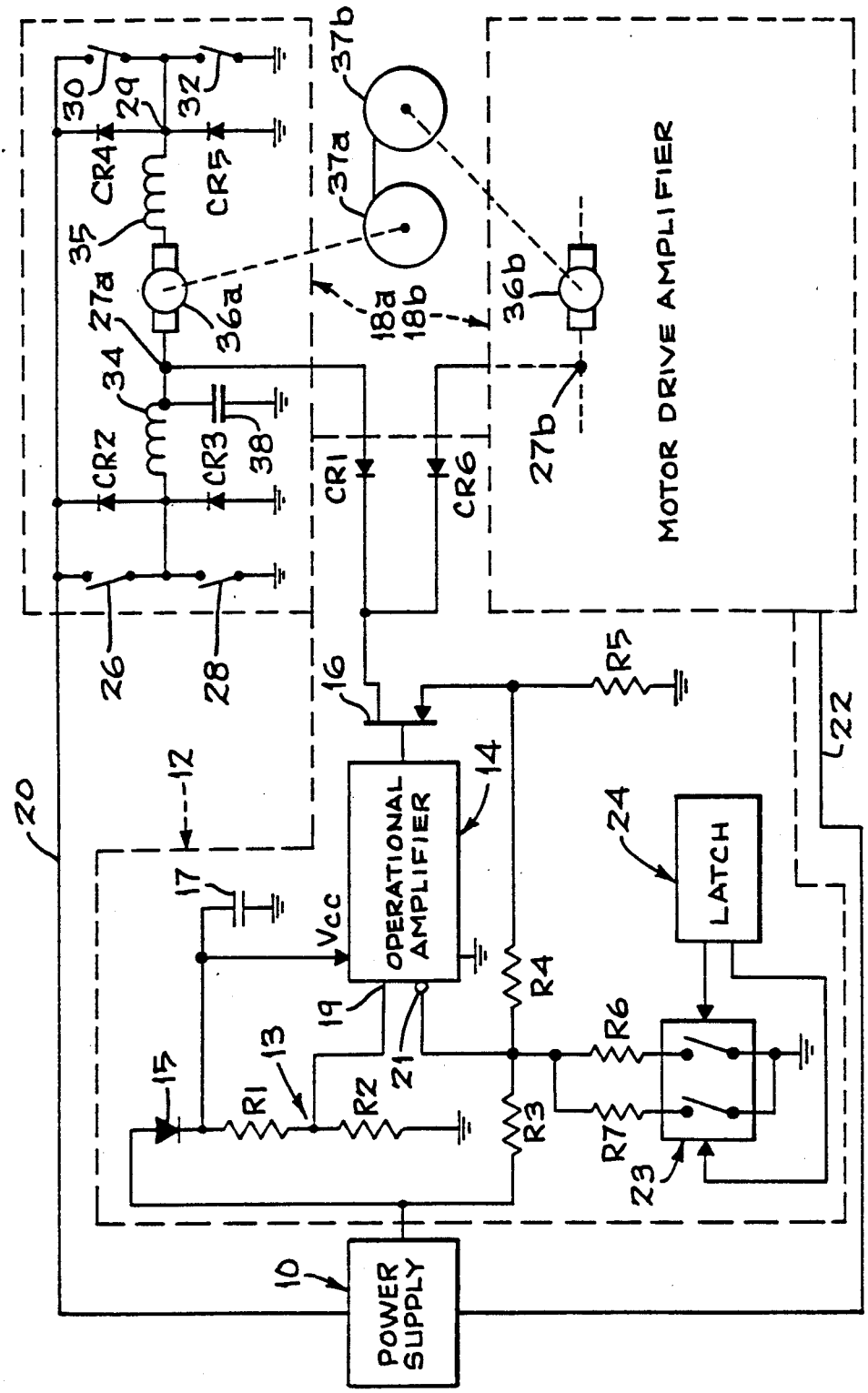

DYNAMIC BRAKE CONTROL FOR A TAPE DRIVE SYSTEM

This invention relates to the control of a tape reel drive system in a tape recorder and in particular to a control circuit for applying controlled dynamic braking to the reel drive motor that is supplying tape, in the event of a sudden loss of power.

BACKGROUND AND SUMMARY OF THE INVENTION

In tape recording and reproducing machines, tape is transported back and forth between a supply reel and a takeup reel. To this end, a tape machine thus typically includes a tape reel drive system and a drive capstan, wherein each component is driven by separate electric motors. The supply and takeup reel motors generally are controlled by respective reel servos to maintain a predetermined tension on the tape, while the capstan is controlled by a capstan servo to selectively move the tape. The tape is moved at a predetermined slower speed during the normal recording and reproducing modes, and is moved at very rapid speed of the order of 300 inches per second during a shuttle mode of operation.

The electrical system of the tape transport apparatus includes a power supply that provides the necessary voltages for powering the reel drive system. In the event of a power failure, the reel drive motors decelerate to a stop as a result of frictional forces. These frictional forces tend to subject the tape to substantially varying tensile loads, which loads are undesirable because they can physically damage the tape or cause pressure erasure of magnetic signals recorded on the tape.

Additionally, the inertia of the takeup reel may be less than that of the supply reel because of differences in the quantity of tape stored on the reels at the time of a power failure, or because of differences in reel size. Thus, during a power failure, the supply reel may decelerate more slowly than that of the takeup reel, whereby the tape is unwound from the supply reel at a rate greater than the rate that the takeup reel is receiving tape. As a result, a slack tape loop may form and tape may be spilled instead of being taken up on the takeup reel during the stopping process. The possibilities of tape spillage from the supply reel and resulting tape damage become especially likely during shuttle operations because of the very high tape speeds involved.

Typical of tape reel motor systems in existing less sophisticated tape recording and reproducing machines are those equipped with mechanical brakes, which brakes are enabled by a solenoid in the event of a power failure. Typically, the mechanical brakes operate differentially in that they exert greater braking torque upon the motor of the reel which supplies tape than upon the motor of the reel which receives tape. In other recording and reproducing machines, dynamic brakes may be employed in the tape reel motor systems, wherein the motor current resulting from the back electromotive force (emf) of the motor produces dynamic braking of the motor upon the occurrence of a power failure.

While such brakes have generally been satisfactory for use in longitudinal audio and quadruplex video recording and reproducing machines, they provide less than satisfactory performance in present more sophisticated helical wrap recording and reproducing machines. The helical wrap machines generally have high tape wrap angles around fixed guides, which configuration causes a prohibitive build up of tension in the tape path extending from the supply reel to the takeup reel. This excessive tension build up, when combined with situations wherein reels having large differences in inertia are used, and wherein varying tape pack diameters occur, causes corresponding continuously varying differences in the dynamic braking requirements. To overcome these problems, a sophisticated dynamic braking system has been developed recently wherein means are provided for controlling the application of braking forces during the entire deceleration of a reel motor until it comes to a stop. Such a dynamic braking system for a tape transport apparatus is disclosed, for example, in U.S. Pat. No. 4,481,449 to D. R. Rodal, issued Nov. 6, 1984, and assigned to the same assignee as this application.

The circuit of the above patent includes a motor drive amplifier (MDA) coupled to drive a DC motor bidirectionally, to thus selectively and controllably rotate the supply and takeup reels in the forward and reverse directions. The MDA is an H-type switching circuit, commonly known as a full wave bridge circuit, that includes a multiplicity of transistor switches and associated diodes. During normal operation of the tape drive with full power available, the transistor switches of the MDA are pulsed to effect a controlled rotational speed of the tape reels. The duty cycles of the pulses of current are varied in accordance with error signals provided by sensing tape tension changes and the motor torque or current. The power fail circuit includes, among other things, a power supply interrupt means that is responsive to a power fail signal, a missing cycle alarm generator and a bidirectional motor drive amplifier including the bridge switching circuit arrangement of previous mention. The system allows controlled application of dynamic braking to the reel drive motors by selectively interrupting the braking process at controlled intervals to maintain a predetermined tape tension during the deceleration of tape movement to a stop. However, the power fail servo system of the patent is relatively complex and is applicable to the control of tape reels and video cassettes of varying sizes and weights that are used in relatively elaborate, computer controlled, tape transport apparatus.

The invention overcomes the shortcomings of the mechanical braking systems, and the complexity of the sophisticated dynamic braking system of previous discussion, while providing a simple and inexpensive circuit for effecting controlled dynamic braking of a tape reel drive motor in the event that a sudden loss of power is experienced by an associated tape transport. The relatively simple dynamic braking circuit particularly is applicable to tape transports employing relatively small and light tape reels, and to tape transports capable of handling tape cassettes of different sizes.

To this end, the present dynamic braking system comprises a control circuit that is activated when a tape transport apparatus experiences power failure. The control circuit is coupled between the power supply and two motor drive amplifiers associated respectively with the tape supply and takeup reel drive motors. The control circuit includes a storage capacitor which is charged during normal operation with power on, and an operational amplifier and a field effect transistor (FET) coupled to the capacitor. In the event of power failure, the failure is detected, and the operational amplifier is enabled, which causes the FET to conduct. The capacitor supplies power to the operational amplifier and the FET, to maintain the FET in a constant current conducting mode until the motor stops. The kinetic energy of the rotating motor, which decelerates upon loss of power, generates a back electromotive force (emf) and thus a dynamic braking current that is dissipated as heat via the FET to supply the energy necessary to brake the motor to a stop. A voltage is fed back to the operational amplifier which adjusts the gate voltage of the FET to maintain its constant current conducting mode, and thus to maintain the dynamic braking current relatively constant. As a result, controlled deceleration and dynamic braking of the drive motor for the tape supplying reel is accomplished with a relatively simple circuit.

DESCRIPTION OF THE PREFERRED EMBODIMENT

The invention is described herein in detail with reference to the sole FIGURE which is a schematic diagram illustrating an implementation of the present dynamic brake control circuit.

With reference to the drawing, a dynamic braking control circuit includes a power supply 10, which may supply +12 volts by way of example. The power supply provides operating power to motor drive amplifiers (MDAs) 18a and 18b during normal operation via electrical leads 20 and 22. The motor drive amplifiers 18a and 18b are coupled to respective drive motors 36a and 36b which, in turn, are coupled to drive a tape supply reel 37a and a tape takeup reel 37b, respectively. For the purpose of simplifying the description, primarily only the components of the motor drive amplifier 18a are shown, since the MDA 18b has the same circuit configuration as MDA 18a. In addition, the description of circuit operation is directed herein to the mode during which the tape is being transported from the supply reel 37a to the takeup reel 37b, which is the forward drive mode for the MDA 18a. In the event the tape is being transported from the takeup reel 37b to the supply reel 37a, as in the reverse drive mode, the functions of the MDAs are reversed.

In addition to supplying the pwer to the MDAs 18a, 18b, the power supply 10 also provides power to a dynamic brake control circuit 12 formed, in essence, of a voltage divider 13, a comparator or operational amplifier (op amp) 14 and a field effect transistor (FET) 16. More particularly, the voltage divider 13 includes resistors R1, R2 coupled between ground and the power supply 10 via a diode 15. The junction of diode 15 and resistor R1 is coupled to a capacitor 17 and thence to ground, while the junction between resistors R1, R2 is coupled to a non-inverting input 19 of the op amp 14. The op amp 14 is supplied with operating voltage $V_{cc}$ via connections to the capacitor 17, and to ground. A resistor R3 also is coupled to the power supply 10 and thence to a resistor R4 as well as to an inverting input 21 of the op amp 14. The free end of the resistor R4 is coupled to a resistor R5 whose other end is grounded, and also to a source electrode of the FET 16. The gate electrode of FET 16 is coupled to the output of the op amp 14.

Resistors R6 and R7 are coupled to the junction of resistors R3, R4 and thence to ground via respective contacts of a transistor switch 23. Although the switch 23 is shown with two contacts coupled to two resistors R6, R7, it may have additional switching contacts coupled to additional resistors. A latch 24 provides a control signal which opens and closes a selected contact of the transistor switch 23 in response to the desired braking torque required for the reel or cassette configuration being used. Thus, switching in a selected resistor effects a change in current feedback gain required to match the circuit with the particular size of the reel and/or cassette being used. The latch 24 is controlled by an input from system control (not shown) and may comprise a thumbwheel input, a computer input, etc., indicative of the reel or cassette system being used.

The drain electrode of the FET 16 is coupled to diodes CR1 and CR6, with CR1 thence being coupled to a junction 27a of the MDA 18a, and CR6 similarly being coupled to a junction 27b in the MDA 18b. For purposes of description, the MDAs 18a and 18b include the supply and takeup reel motors 36a and 36b although the motors themselves are not part of the MDA. MDA 18a includes a pair of transistor switches 26, 28 coupled from line 20 to ground, and a pair of diodes CR2, CR3 which shunt the respective switches 26, 28. The common junctions of the diodes and switches are coupled to one end of a coil 34, which thence is coupled to the motor 36a via the junction 27a. The junction 27a also is coupled to ground via a capacitor 38 whereby the coil 34 and capacitor 38 provide a low pass filter. The other end of the motor 36a likewise is coupled to a coil 35, and thence by means of a junction 29 to the common junctions of a pair of transistor switches 30, 32 and shunting diodes CR4, CR5, as depicted.

In operation, when the tape is moving from the supply reel 37a to the takeup reel 37b, the MDA 18a is controlling the tape supply motor drive system. With full power available in the normal forward drive mode, transistor switches 26 and 32 are pulsed closed and opened and diode CR3 conducts intermittently. Conversely, when the tape is moving from the takeup reel 37b to the supply reel 37a in the normal reverse drive mode, the corresponding components in the MDA 18b are actuated to control the takeup reel from which the tape is unwinding. During normal operation with full power available in the reverse drive mode, the transistor switches 28 and 30 are pulsed and diode CR5 conducts intermittently.

By way of background, the transistor switches are pulse width modulated to open and close in response to a square wave signal of predetermined frequency, such as 50 kHz, obtained from a signal generator (not shown). The duty cycles of the reel drive motors are varied by respective servo means (not shown) in response to error signals generated by changes in tape tension and motor torque. Variations in the duty cycle result in changes in the average voltage supplied by the MDA 18a or 18b, which controls the rotational speed of the particular reel drive motor. The specific operation of the MDA 18a and MDA 18b are more fully described in the U.S. Pat. No. 4,481,449 of previous mention, and the subject matter thereof is incorporated herein by reference.

During normal operation, the power supply 10 also provides a selected voltage to the storage capacitor 17 via the diode 15. The capacitor 17 stores an amount of electrical energy determined by its capacity which, in one embodiment of this invention, is selected to enable storage of in order of 0.007 watt-seconds of energy. This affords an interval of 5 to 30 seconds for controllably decelerating and stopping the tape reels and motors when operating at the high tape shuttle speed of, for example, 300 inches per second.

As depicted in the drawing, the dynamic brake control circuit 12 includes resistors R3 and R4 coupled between the power supply 10 and the comparator or op amp 14. The resistors R3 and R4 sense the output voltage from the power supply when it is operating normally, and apply a signal to the inverting input 21 of the op amp. The power supply also provides the voltage via the diode 15 through the voltage divider 13 consisting of the resistors R1 and R2, and to the non-inverting input 19 of the op amp 14. If the voltage appearing at input 21 is greater than that at input 19, there is a zero volt output from the op amp, which turns off the FET 16. In effect, the dynamic brake control circuit 12 is open and nonconducting when the power supply 10 is supplying full power to an MDA.

In the event that the power supply to the tape drive apparatus fails or is suddenly turned off, the motors 36a, 36b driving the supply and takeup reels of the tape apparatus lose power, the voltage on input 21 drops below the voltage on input 19 of the op amp 14, which then turns on the FET 16, and the dynamic brake control circuit 12 is enabled. This controls the braking action of the tape reel drive system to prevent the sudden slowdown and the attentent spillage or damage to the moving tape. This is especially significant when power is lost during the shuttle mode when the tape is traveling at very high speeds and any rapid deceleration may cause the tape to spill or form a slack loop, or snap, stretch or otherwise be damaged.

More particularly, upon loss of power to the tape drive system, the voltage fed to the inverting input 21 of the op amp 14 in the dynamic brake control circuit 12 likewise drops rapidly to zero volts. In the absence of a voltage signal at the anode of the diode 15, the capacitor 17 supplies its stored electrical energy through the voltage divider 13, and particularly through resistor R1 to the input 19 of the op amp 14. The diode 15 blocks any drain of current back towards the power supply 10 from the capacitor 17. The current sampling resistor R5, connected between the source electrode of FET 16 and ground potential, produces a voltage proportional to the desired dynamic braking current which flows from the drain to source electrodes of FET 16. This current sample voltage is determined by the relative values of the resistors R1 through R6 (or R7) and capacitor 17 value, and is fed to input 21 of the op amp 14 through resistor R4. It may be seen that as the voltage at input 19 of the op amp 14 becomes more positive than that at the input 21, the op amp supplies an adjusted gate voltage to the gate electrode of the FET 16 which maintains the voltage across the sampling resistor R5, and thus the dynamic braking current through the resistor R5, relatively constant. Thus, the current sampling resistor R5 senses the FET current and correspondingly biases the inverting input 21 of the op amp 14 to selectively maintain the op amp and thus the FET 16.

When the FET 16 is enabled, the linear analog output current from the FET is applied to the cathodes of diodes CR1 and CR6. When the tape is traveling in the forward direction from the supply reel 27a to the takeup reel 27b, the junction 27a is positive with respect to ground, and the junction 27b is negative with respect to ground, causing diode CR1 to conduct while diode CR6 blocks current to MDA 18b. Conversely, when the tape is moving in the reverse direction from the takeup reel to the supply reel and there is a voltage failure, diode CR6 conducts and CR1 blocks current to MDA 18a. Thus diodes CR1 and CR6 effectively select the MDA circuit which will supply the dynamic braking current.

Accordingly, a controllable conductive path is provided from diode CR5, which is tied to ground potential, through the motor 36a and the conducting diode CR1 to the drain electrode of the FET 16, when the tape is transported from the supply reel to the takeup reel. As mentioned, resistor R5, which is coupled to the source electrode of the FET, controls the amount of current flowing through the FET and the MDA and thereby controls the braking torque applied to the drive motor shaft. Current flows to the motor 36a as long as the motor is turning and the capacitor 17 is discharging and providing electrical energy to maintain the op amp 14 and FET 16 in a conducting mode. The discharge period is determined by the storage capacity of the capacitor 17 and the load on the capacitor. These parameters are selected so that deceleration and dynamic braking of the tape drive system are controlled for a sufficient time based upon the known rotational speed and inertia of the drive motor and reel system.

More specifically, the resistors R6, R7, switch 23 and latch 24 illustrate means for changing the braking current to optimize circuit operation with the size and inertia of the reel or cassette being used. By closing a selected contact of the switch 23, the resistor R6 or R7 is placed in the circuit to change the current feedback gain. Although a pair of resistors are shown, additional resistors may be employed along with respective switch contacts to allow a corresponding number of gain changes commensurate with the number of different reel sizes. In general, the larger the reel or greater its inertia, the greater the braking current required.

By way of further explanation, upon the loss of power, the back emf generated by the rotating reel motor is used in conjunction with the circuit to convert kinetic energy of the motor to electrical energy in the conductive path, which then is dissipated as heat via the FET 16. During the high speed shuttle mode, the junction 27a between the coil 34 and the capacitor 38 of the MDA 18a reaches a relatively high positive voltage of the order of +20 to +30 volts, that is generated as a result of the high speed armature rotation. As previously described, the positive voltage at the junction 27a forward biases the diode CR1 which, together with the enabled FET, provides the conductive path for the dynamic brake current generated by the back emf. The path includes the diode CR5 which becomes biased from −0.7 to −1.0 volts, the armature of the motor 36a, the diode CR1 and the FET 16. The dynamic braking action continues for a period that is sufficient to ensure a controlled deceleration of the tape reel drive system, as determined by the amount of stored electrical energy supplied via the capacitor 17 to maintain the op amp 14 and FET 16 on, as well as by the magnitude of the back emf that is generated by the deceleration of the rotating motor 36a.

Thus it may be seen that when power fails, the dynamic brake control circuit 12 is enabled to control the deceleration of the tape drive system using a simple and inexpensive circuit having a relatively small number of components. Although the disclosure is directed to the use of the control circuit in a tape transport apparatus, the control circuit 12 may be embodied in other apparatus incorporating a power supply subject to failure, and an electromechanical device that is actuated by the power supply and needs to be stopped rapidly when there is a sudden decrease in power.

It should be understood that the scope of the invention is not limited to the specific embodiment set forth above. For example, the circuit voltages, tape speeds and transistor switching frequency may be varied, and resistive and capacitive values may be tailored to accommodate the particular parameters of the dynamic braking circuit being used.

What is claimed is:

1. A circuit for controlling the dynamic braking of an electromechanical apparatus actuated by a power supply, comprising:
   means coupled to the power supply for storing electrical energy when said power supply is operative and for supplying the stored electrical energy when said power supply fails;
   a control circuit including an operational amplifier coupled to the storing means for providing a brake control signal when said power supply fails;
   a first voltage divider coupled from the storing means to a first input of said operational amplifier, for providing a reference voltage to said first input; and
   switch means electrically coupled between the control circuit and the electromechanical apparatus for initiating a separate conductive path for a braking signal in response to the brake control signal to dynamically brake the electromechanical apparatus to a stop.

2. The circuit of claim 1 further including:
   a second voltage divider coupled from the power supply to a second input of said operational amplifier, for providing a signal to the second input indicative of the presence or absence of a power supply failure.

3. The circuit of claim 2 wherein:
   said switch means includes a field effect transistor; and
   said operational amplifier enables the field effect transistor in response to the brake control signal to initiate the conductive path when the voltage to the second input becomes negative with respect to that of the first input.

4. The circuit of claim 3 including:
   current sampling means coupled to the field effect transistor to further define the conductive path and for supplying a current sample voltage to the second voltage divider.

5. The circuit of claim 3 including:
   a second diode further defining the conductive path between the field effect transistor and the electromechanical apparatus.

6. The circuit of claim 1 wherein the electromechanical apparatus includes:
   a fair of bidirectionally rotatable motors driven by respective motor drive amplifiers in the forward and reverse directions; and
   said respective motor drive amplifiers being selectively coupled to a respective conductive path and to the switch means in response to the direction of rotation of the motor when the power supply fails.

7. The circuit of claim 6 including:
   field effect transistors defining said switch means; and
   respective diodes coupled in the respective conductive paths between the field effect.

8. A method for controlling the dynamic braking of an electromechanical apparatus actuated by a power supply, comprising the steps of:
   storing electrical energy when said power supply is operative and supplying the stored electrical energy when said power supply fails;
   genernating a brake control signal in response to the supplied electrical energy when said power supply fails;
   providing a reference voltage commensurate with the stored electrical energy;
   providing a separate conductive path for the apparatus in response to said brake control signal being maintained by supplying said stored electrical energy;
   initiating the separate conductive path when the power supply voltage becomes less than the reference voltage; and
   dynamically braking the electromechanical apparatus to the stop via the separate conductive path.

9. The method of claim 8 including:
   supplying a sample voltage indicative of the apparatus braking signal in the separate conductive path when the power supply fails; and
   maintaining the brake control signal relatively constant in response to a comparison of the sample voltage and the reference voltage during the braking of the electromechanical apparatus.

10. A circuit for controlling the dynamic braking of an electromechanical apparatus actuated by a power supply, comprising:
    means coupled to the power supply for storing electrical energy when said power supply is operative and for supplying the stored electrical energy when said power supply fails;
    a control circuit coupled to the storing means for providing a brake control signal when said power supply fails;
    switch means coupled between the control circuit and the electromechanical apparatus for initiating a conductive path for a braking signal in response to the brake control signal to dynamically brake the electromechanical apparatus to a stop;
    current sampling means coupled to the switch means for supplying a sample voltage indicative of the braking signal to the control circuit when the power supply fails;
    said storing means supplying the stored electrical energy as a reference signal to the control circuit; and
    said control circuit maintaining the brake control signal relatively constant in response to a comparison of the sample voltage and the reference signal during the braking of the electromechanical apparatus.

11. A circuit for dynamically braking via its back electromotive force, a drive motor which is being driven by a power supply via a motor drive amplifier, comprising:
    a control circuit coupled between the power supply and the motor drive amplifier for comparing a preselected reference voltage to the power supply voltage in the absence or presence of a power failure;
    said control circuit being disabled as long as the power supply voltage is greater than the preselected reference voltage as in the absence of a power failure, and being enabled when the power supply voltage is less than the preselected reference voltage as in the presence of a power failure;

said control circuit including an electrically conductive path for providing a dynamic braking current flow through the drive motor commensurate with the back electromotive force generated thereby; and energy storage means for supplying sufficient voltage to maintain the dynamic braking current flow during the braking of the drive motor to a stop.

12. The circuit of claim 11 wherein the control circuit further includes:

switch means defining the electrically conductive path when the power supply voltage is less than the preselected reference voltage; and current sample means coupled to the switch means and further defining the electrically conductive path, for supplying a sampled voltage indicative of the dynamic braking current for comparison with the preselected reference voltage to maintain the dynamic braking current constant until the drive motor stops.

13. A circuit for the controlled dynamic braking of tape supply and takeup reel drive motors via their back electomotive force in the event of power failure of an associated power supply, comprising:

motor drive amplifiers coupled to respective tape supply and takeup reel drive motors;

means for storing electrical energy coupled to said power supply;

circuit means coupled to the energy storage means for receiving therefrom a reference voltage signal of selected magnitude at a first input thereof, and coupled to the power supply for receiving a second voltage signal of second magnitude at a second input thereof, said circuit means being disabled when said power supply is operational and being enabled to supply a brake control signal when said power supply fails;

switch means responsive to the circuit means during a power failure for initiating a braking current conductive path for dissipating the back electromotive force of the drive motor over a period of time sufficient to brake the drive motors; and current sampling means in the braking current conductive path for supplying a braking current sample voltage to the second input to maintain the brake control signal and thus the conductive path through the switch means.

14. The circuit of claim 13 wherein the circuit means includes means for comparing the braking current sample voltage with the reference voltage signal and for supplying a substantially constant brake control signal to the switch means when the power supply fails.

15. The circuit of claim 14 including:

voltage divider means coupled to the power supply for supplying the reference voltage to the first input of the circuit means;

wherein the second voltage signal of the second magnitude at the second input of the circuit means decreases to a value lower than that of the reference voltage to enable the switch means in the event the power supply fails; and said energy storage means maintains the switch means conductive by supplying the reference voltage to the circuit means for comparison with the current sample voltage until the drive motors brake to a stop.

16. The circuit of claim 13 wherein:

said energy storage means is a capacitor;

said circuit means includes an operational amplifier having the first and second inputs;

said switch means is a field effect transistor; and said current sampling means is a resistor coupled from the field effect transistor to ground.

17. The circuit of claim 13 including:

respective diodes disposed between the switch means and respective motor drive amplifiers for determining which motor drive amplifier is placed in the conductive path.

18. A method for controlling the dynamic braking of a tape drive system having a bidirectional motor which generates a back electromotive force signal when decelerating, and motor drive amplifier means coupled to drive the motor via a power supply, comprising the steps of:

charging a storage capacitor with electrical energy from the power supply when the power supply is operative;

detecting the occurrence of a power supply failure;

supplying the electrical energy from the storage capacitor upon detecting the power supply failure;

providing a conductive path through the motor in response to the step of supplying, to dissipate the back electromotive force signal of the motor in the conductive path;

maintaining the conductive path in response to the supplied electrical energy for a time interval sufficient to brake the motor to a stop;

wherein the step of maintaining includes sampling the braking current generated by the back electromotive force signal, and comparing the sampled braking current with the electrical energy supplied from the storage capacitor to maintain the conductive path for the duration of the electrical energy.

* * * * *